United States Patent

[11] 3,577,199

[72] Inventor Warner W. Schultz
 Schenectady, N.Y.
[21] Appl. No. 852,360
[22] Filed Aug. 22, 1969
[45] Patented May 4, 1971
[73] Assignee The United States of America as represented by the United States Atomic Energy Commission

[54] MEASURING IRRADIATION-INDUCED DEFORMATIONS OF MATERIALS
8 Claims, 1 Drawing Fig.

[52] U.S. Cl. ..................................................... 250/83.1,
 250/83CD, 250/106S
[51] Int. Cl. ..................................................... G01t 3/00,
 G01t 5/00
[50] Field of Search........................................... 250/83.1,
 106 (S), 83 (CD)

[56] References Cited
UNITED STATES PATENTS
3,225,196 12/1965 Gigon et al. .................. 250/83.1
3,493,751 2/1970 Davies et al. ................. 250/83.1X

OTHER REFERENCES

A compact device for low temperature neutron irradiation of deformed specimens under a defined tensile stress, by Mughrabi, from Journal of Scientific Instruments, 1969 Series 2, Vol. 2, April 1969, pgs. 351 and 352, 250— 106

Primary Examiner—Archie R. Borchelt
Attorney—Roland A. Anderson

ABSTRACT: This invention relates to a method and apparatus for measuring irradiation-induced change in length of a test sample. Neutron irradiation produces a differential change in length between the lengths of a test sample and a comparison standard. Mechanical pivot means are provided for magnifying the differential change in length. Means including a source of fissionable material and a track detector surface are provided for recording the magnified differential change in length.

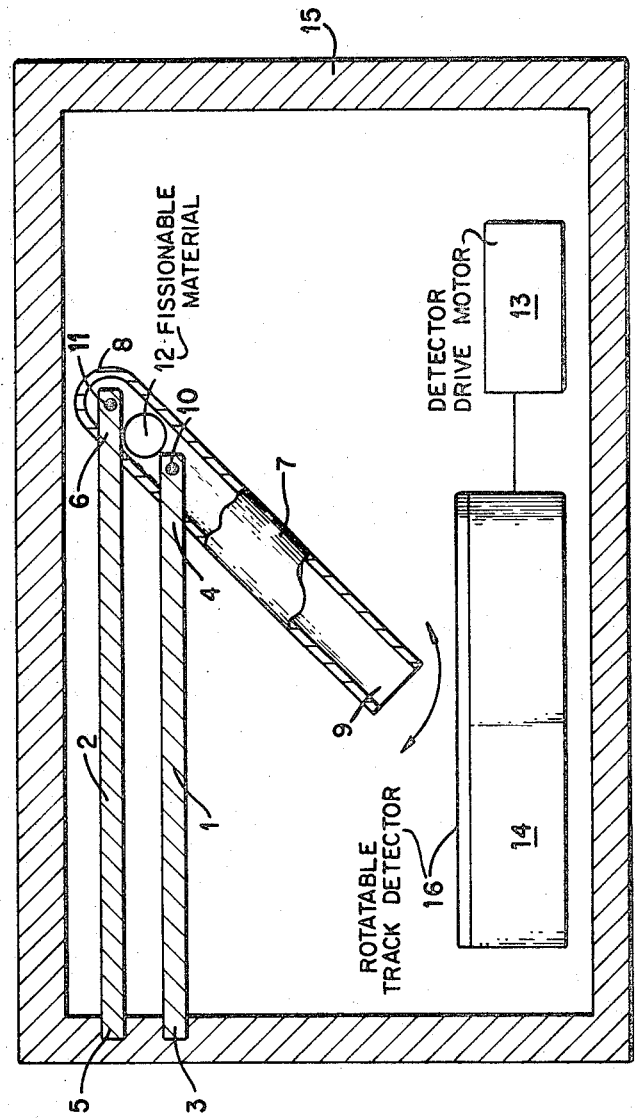

MEASURING IRRADIATION-INDUCED DEFORMATIONS OF MATERIALS

BACKGROUND OF THE INVENTION

This invention was made in the course of, or under, a contract with the U.S. Atomic Energy Commission.

In order to evaluate effects of reactor irradiation on structural materials, it is desirable to make in-pile measurements of deformations experienced by materials due to reactor irradiation. Experience with conventional displacement transducers (e.g., LVDT's) or strain gauges has been unsatisfactory because of the effects of reactor irradiation on the instrumentation itself, which may preclude obtaining meaningful measurements of the test sample.

Measuring methods previously attempted have involved a direct measurement of the length of a sample material. The length of a sample material upon exposure to irradiation generally exhibits only a small percentage change. Accordingly, in view of the often small original length of test samples of material, determination of changes in such length presents critical problems in accuracy of measurement.

SUMMARY OF THE INVENTION

Accordingly, it is an object of this invention to provide a method and apparatus for measuring the irradiation-induced deformation of a structural material.

It is another object of this invention to provide a method and apparatus for measuring the differential in the change in length of a test sample to that of a comparison standard.

It is a further object of this invention to provide means for magnifying the differential in the change in length of a test sample to that of a comparison standard, thereby permitting more accurate measurement of such differential.

To accomplish the above objects first ends of a comparison standard and a sample material undergoing testing ("test sample") are rigidly mounted within a neutron permeable container. Second ends of the test sample and comparison standard are independently connected to proximately spaced pivots located at a first end of an elongated fission fragment collimator. A source of fissionable material is disposed within the fission fragment collimator at a location near the first end thereof. The fission fragment collimator is supported only by the two pivots at the second ends of the comparison standard and test sample, respectively. Initially, the collimator assumes a reference position. A differential in change in length of the test sample and comparison standard, resulting from neutron irradiation, is transmitted to the collimator through the pivot connections. The arc traced by the second end of the collimator reflects a magnification of this differential change in length. When the device of this invention is placed in a neutron flux, fission fragments from the source of fissionable material within the collimator travel to the opposite end of the collimator where they make a small damage area in a track detector surface. As differential expansion in test sample and comparison standard takes place due to irradiation, movement of the collimator causes a damage line to be traced in the track detector surface. After termination of the test the track detector is etched in a hydrofluoric acid solution to make the damage pattern visible.

In contrast to the displacement transducers presented by the prior art, my invention is based on the differential in the change in length of a test sample to that of a comparison standard. No direct measurement of change in length of a test sample need be made. Measurement errors attributable to effects of reactor irradiation on test instrumentation are thus substantially eliminated.

Accuracy and convenience in measuring the differential change in length are enhanced by the means provided for magnifying and subsequently recording the magnified differential change in length.

DESCRIPTION OF PREFERRED EMBODIMENT

The novel features of the present invention, as well as additional objects and advantages thereof, will be more readily understood from the following description, when read in connection with the accompanying drawing.

Referring to the drawing, a test sample 1 and comparison standard 2 are shown within a sealed neutron permeable container 15. In a preferred embodiment, first ends 3 and 5 of the test sample and comparison standard, respectively, are shown rigidly mounted to a wall of container 15. As an alternative, mounting means may be disposed within the interior of container 15.

Second ends 4 and 6 of the test sample and comparison standard are connected, respectively, to pivots 10 and 11 disposed adjacent a first end 8 of a fission fragment collimator 7. A source 12 of fissionable material is disposed within fission fragment collimator 7 at a location adjacent pivots 10 and 11.

A track detector surface is disposed within container 15 adjacent a second end 9 of fission collimator 7. Detector surface 16 may be supported by means such as drum 14. A spring drive 13 may be used to rotate drum 14. Alternatively, electrical drive means could be substituted for spring drive 13.

In operation of the present method and apparatus, fission fragments from fissionable material 12 travel to the opposite end 9 of collimator 7 where they make a small damage area in track detector surface 16. The pressure inside the container must be kept low enough so that the range of the fission fragments is longer than the greatest distance from the fissionable material to the track detector surface. A pressure of a few millimeters of mercury would be acceptable. As differential expansion in test sample 1 and comparison standard 2 takes place due to neutron or other irradiation, movement of collimator 7 is produced by a change in the relative position of pivots 10 and 11. Thus, a differential change in length of sample 1 and 2 is translated via the pivot connections to movement of end 9 of collimator 7. The distance traveled by end 9 of the collimator represents a magnification of the differential change in length. The extent of this magnification is given approximately by the ratio of the distance between pivots 10 and 11 to the distance from pivot 11 to the track detector surface. The smaller the distance between pivots, the larger is the magnification obtained through use of the present invention.

As information leading to the intelligent selection of a comparison standard is probably not available, measurements made with the apparatus described herein may be used as a basis for comparison standard selection. Ideally, the material selected as the standard would exhibit zero change in length for any radiation dose. In choosing a standard one would select the material from a limited number of samples that is nearest to this ideal. In this selection process, one of a group of materials is arbitrarily selected as the comparison standard; the other materials of the group are used as test samples and compared thereto. Those samples having changes in length greater than the arbitrary standard would cause the fission collimator to move to the right (see drawing). Those materials undergoing smaller changes in length than the arbitrary standard would cause the collimator to move to the left. The material producing the greatest excursion of the collimator to the left is chosen as the comparison standard since it exhibits the smallest change in length for a given radiation dose. Absolute changes in length of the selected comparison standard can now be measured by a comparison of actual measurements of length before and after each exposure. A curve of change in length versus exposure time (dose) can be used to correct all subsequent measurements of differential expansion.

Detector surface 16 may be of mica, quartz, glass or other suitable track-detecting material. Thin sheets of mica are flexible and can be wound around a cylinder while in use. These sheets can be used in flat form for analysis of the fission track record after the experiment. After termination of the experiment the track detector surface 16 is etched in a hydrofluoric acid solution to make the damage pattern visible. Muscovite mica can be used at temperatures of up to about 500° C. and is etched in 48 percent hydrofluoric acid for periods up to about 30 minutes at 25° C. The longer etching times produce larger tracks.

Fused quartz is especially useful as a track detector for the following reasons:
1. It is usable at temperatures up to about 700° C.
2. The induced radioactivity is comparatively low after cooling times of a few days.
3. Tracks in fused quartz are not formed by neutron, gamma, beta or X-radiation.
4. The etched fused quartz track detector represents a permanent record of the experiment.

It should be pointed out that the apparatus described is not limited in application to displacement measurement. For example, it could be used to make a permanent record of the relative fission power in a reactor core over a long period of time.

If information relative to the reactor flux is not needed, one could substitute an isotope exhibiting spontaneous fission (e.g., Am241) for the fissionable material. This would permit making a record without benefit of neutrons and could be useful in investigating deformations due entirely to temperature changes.

I claim:
1. A method of measuring irradiation-induced change in length of a test sample comprising:
  a. placing a comparison standard in proximity to the test sample;
  b. irradiating the test sample and the comparison standard to produce a differential change in length between the lengths of said test sample and said comparison standard;
  c. mechanically magnifying said differential change in length; and
  d. recording the magnified differential change in length.
2. Apparatus for measuring the irradiation-induced change in length of a test sample comprising:
  a. a comparison standard in proximity to the test sample;
  b. means for irradiating the test sample and comparison standard with neutrons;
  c. mechanical means for magnifying the differential change in length between the lengths of said test sample and said comparison standard occasioned by the neutron irradiation; and
  d. means for recording the magnified differential change in length.
3. Apparatus according to claim 2, wherein said means for magnifying the differential change in length comprises:
  a. a fission fragment collimator;
  b. means for rigidly and independently mounting a first end of the test sample and a first end of the comparison standard;
  c. means for pivotally connecting a second end of the test sample to said fission fragment collimator; and
  d. means for pivotally connecting a second end of the comparison standard to said fission fragment collimator.
4. Apparatus according to claim 3, wherein the means for recording the magnified differential change in length comprises:
  a. a source of fissionable material disposed within said fission fragment collimator adjacent a first end thereof; and
  b. a track detector surface in proximity to a second end of said fission fragment collimator.
5. Apparatus according to claim 4, wherein quartz is used as the track detector surface.
6. Apparatus according to claim 4, wherein mica is used as the track detector surface.
7. Apparatus according to claim 4, wherein glass is used as the track detector surface.
8. Apparatus according to claim 4, further including means for rotating the track detector surface.